Aug. 6, 1968    G. R. KAUTZ ET AL    3,395,628
EXPOSURE DEVICE

Filed March 1, 1965    4 Sheets-Sheet 1

INVENTORS
GEORGE R. KAUTZ &
CLARENCE J. LAWSON
BY
Robert E. Strausser
ATTORNEY

Aug. 6, 1968          G. R. KAUTZ ETAL          3,395,628
                         EXPOSURE DEVICE
Filed March 1, 1965                           4 Sheets-Sheet 2

INVENTORS
GEORGE R. KAUTZ &
CLARENCE J. LAWSON
BY
Robert E. Strausser
ATTORNEY

INVENTORS
GEORGE R. KAUTZ &
CLARENCE J. LAWSON
BY
Robert E. Strausser
ATTORNEY

Aug. 6, 1968  G. R. KAUTZ ET AL  3,395,628
EXPOSURE DEVICE

Filed March 1, 1965  4 Sheets-Sheet 4

INVENTORS
GEORGE R. KAUTZ &
CLARENCE J. LAWSON
BY
Robert E. Strausser
ATTORNEY

United States Patent Office 3,395,628
Patented Aug. 6, 1968

3,395,628
EXPOSURE DEVICE
George R. Kautz and Clarence J. Lawson, Seneca Fal's, N.Y., assignors to Sylvania Electric Products Inc., a corporation of Delaware
Filed Mar. 1, 1965, Ser. No. 435,991
18 Claims. (Cl. 95—1)

ABSTRACT OF THE DISCLOSURE

A device for exposing cathode ray tube sensitized screens to provide discrete screen patterns through an appropriate negative mask during the manufacture of color tubes. Exposure radiation emanating from a light source passes through movable shutter means and a light refractive medium to impinge the sensitized panel adjustably spaced thereabove. The light source enclosure comprises a lamp and a related reflector having enhanced cooling means and associated improved muffler means. A rotatable stage, formed to provide definite positioning of the optical system to effect angular light exposure of the screen through the related negative mask, accommodates the light source therebelow, the light refractive medium thereabove, and the shutter means therebetween. Three point suspension of the stage base portion imparts stabilizing support to the exposure structure to eliminate torsional stress therein to provide optimum performance of the optical system.

This invention relates to apparatus utilized in the manufacture of cathode ray tubes and more particularly to an adjustable exposure device for discretely exposing, through an appropriate negative, the light sensitive screen of a color cathode ray tube.

Cathode ray tubes utilized as image reproduction devices, such as in color television applications, usually employ one or more electron guns for providing a source and the acceleration, focusing and modulation voltages for the electron beam or beams employed in the cathode ray tube. When a plurality of electron guns are unitized into an integral gun structure, convergence electrodes or pole pieces are conventionally included as terminal portions of the electron gun assembly. In operation, the modulated electron beams are predeterminately deflected across the screen of the tube to provide electron impingement upon selected color fluorescing material configurations comprising the screen on the tube viewing panel to reproduce the transmitted color display. It is conventional practice to interpose a grid, mask, or other type of negative structure between the electron gun assembly and the screen of the tube to provide either masking of the screen or deflection or focusing of the electron beam or beams.

The electron-sensitive screen of a conventional color cathode ray tube is generally comprised of multitudinous dot, bar, or stripe formations of various phosphors capable of emitting green, red, and blue color luminescence upon electron beam bombardment. The configuration of the color phosphor patterns constituting this type of color screen are formed in accordance with the number of electron guns utilized and with the configuration and operative characteristics of the grids or masks employed in the respective tube.

Since innumerable color phosphor groups are required to produce a high resolution picture display of desired color purity, the screening process employed must be one that is capable of accurately forming a multitude of similar discrete phosphor configurations. In one preferred method of screen formation, a printing technique is utilized wherein a cathode ray tube viewing panel having an interior coating thereon containing a photoresist material and a desired color phosphor, is suitably exposed through an appropriate negative or foraminous mask by radiant energy emanating from a discretely oriented point source of light. Subsequent development of the exposed screen produces the first color phosphor pattern, for instance, an array of green fluorescent color phosphor configurations. This method is sequentially repeated with the red and the blue color phosphor materials to complete the deposition of the tri-color screen. The point source of light is appropriately offset from a central axis during the exposure operation for each respective color phosphor to provide an array of individual color patterns which are proportionately displaced from one another to form the particular type of color screen under consideration.

The photoprinting technique employed in exposing sensitized screens for color cathode ray tubes of the above-described type is conventionally consummated in a screen exposure structure known in the art as a "lighthouse" apparatus. This structure contains an optical system comprising a light permeable refractive medium or corrective lens and a conjunctive point light source relatively positioned to provide a sufficient amount of light energy for proper exposure activation of the light sensitive coating disposed on the screen panel. For example, to produce a dotted screen pattern, the components of the optical system are oriented to radiate light over the whole of the foraminous mask to expose discrete areas on the sensitized screen therebehind and thus produce a color phosphor array having exactness of dot size and orientation in accordance with the registration requirements of subsequent electron beam impingement. Several factors determine the optimum setup of the optical system, whereupon the screen-lens-light source distance relationships are altered depending upon variables such as the size and shape of the screen, the sensitivity of the photoresist material, the phosphor particle size, UV absorption characteristics of the phosphor and the size of the mask apertures. "Lighthouses" are often custom constructed according to one set of variables and thus are not readily modified to accommodate an alternate arrangement of variables. This has been noted to be especially true when photoresist-phosphor combinations for the separate color areas are of different compositions, the characteristics of which necessitate the use of diverse optical distance setups. Furthermore, it has been found that, as exposure time is increased, the dots of the array that are oriented radially outward from the center of the screen tend to become larger in an asymmetrical manner. Therefore, time length of the exposure period is another critical factor meriting exact consideration. The control of exposure by intermittent lamp operation often lacks exactness as lamp response isn't instantaneous with applied voltage. In addition, it has been found that on and off cycling appreciably shortens usable lamp life as the intensity of the light output decreases markedly as a result of extensive cycling. A manual shutter operation introduces the variable of the human element.

Each time a new lamp is installed, reflective means associated with the lamp within the light source enclosure is usually adjusted at an approximation setting and remains so fixed for the life of the lamp. The cooling system associated with the lamp and reflector, because of the directed volume of moving air required for adequate cooling, often produces audible sound levels of annoying frequencies. Maximum utilization of light is seldom realized. Usually there are few or no provisions made for operational adjustments.

Accordingly, it is an object of the invention to reduce the aforementioned difficulties and to provide an improved screen exposure device.

A further object is the provision of an improved screen exposure device having adjustable features for varying the optical system therein.

Another object is the provision of a screen exposure device having facile adjustable means for achieving optimum light output from the optical system light source.

A further object is to provide an adjustable screen exposure device having improved light source cooling means that has both increased efficiency and quietness of operation.

Still another object is to include timed light control means within the optical system of an adjustable screen exposure device.

A further object is to provide means for stabilizing the support of the exposure structure to insure optimum performance of the optical system therein.

An additional object is the provsion of a versatile cathode ray tube screen exposure device adaptable to the photo-printing exposure of various sizes and shapes of sensitized screens through associated grid negatives wherein the final positions of the light rays are coincident with the subsequent electron beam landing positions existent in the operating tube.

The foregoing objects are achieved in one aspect of the invention by the provision of a versatile screen exposure device wherein the sensitized screen panel, as the target portion of an optical system, is positioned on a support frame adjustably spaced from the refractive portion of the system by support shafts and related adjustment blocks. Beneath the refractive medium is a movable shutter, having actuation means and a time control adjustment, regulated to interrupt the radiant energy emanating from a discretely positioned point light source. The light source enclosure has therein a lamp and a related adjustable reflector to readily achieve optimum light output. Discrete channelling within the reflector effects improved air cooling of both the reflector and the associated lamp, and a tuned cavity muffler attached to the exhaust port of the enclosure promotes quite operation of the cooling arrangement. A base oriented laterally rotatable stage, accommodating the point light source, shutter means, and the refractive medium portions of the optical system, is formed to provide definite positioning of the optical system to effect angular light activation of the screen through the related negative mask. Three-point suspension of the base imparts stabilizing support to the exposure structure and promotes optimum performance of the optical system.

For a better understanding of the present invention, together with other and further objects, advantages, and capabilities thereof, reference is made to the following specification and appended claims in connection with the accompanying drawings in which:

Figure 1:
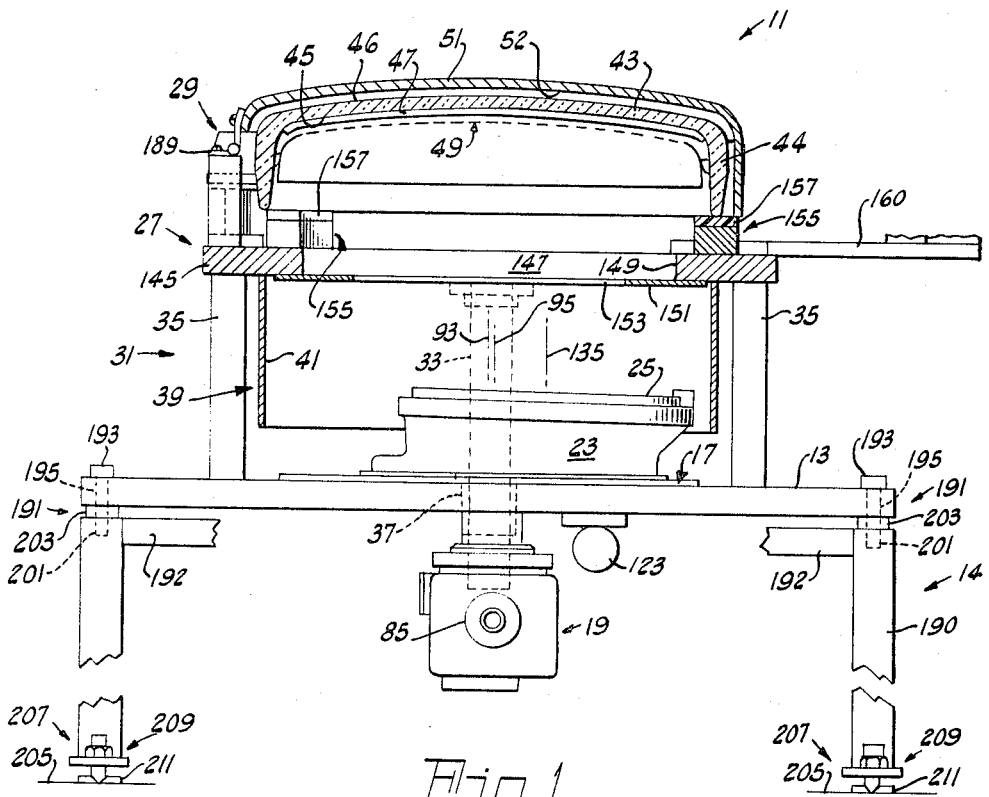
FIGURE 1 is a vertical plan view of the screen exposure device partially in cross section.
Figure 2:
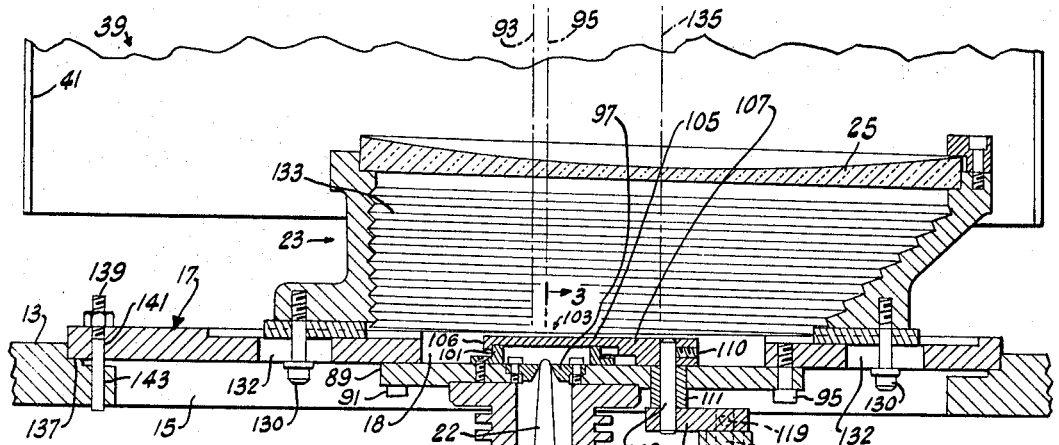
FIGURE 2 is a portion of the exposure device illustrated in FIGURE 1, the point light source, the refractive medium, and the support structure therefore being shown substantially in cross section.

Referring to the drawings, there is shown in FIGURES 1 and 2 a cathode ray tube screen exposure device 11 which is built upon a base plate portion 13 such as a piece of machined boiler plate and three point supported from a rugged table frame or bench 14 having space therebeneath.

The base 13 has a substantially circular opening 15, formed to accommodate a movable stage 17 which can be rotationally indexed into predetermined positions as wall be later explained. This stage 17 is adapted to integrally accommodate a point light source enclosure 19 on the under surface thereof with associated shutter means 21 formed to control the light terminally emanating from the concentration or light collector rod 22. Attached to the upper surface of the stage, in a manner to permit lateral adjustment thereon, is a lens support structure 23 terminally adapted to hold the light permeable refractive medium or lens 25.

Figure 8:
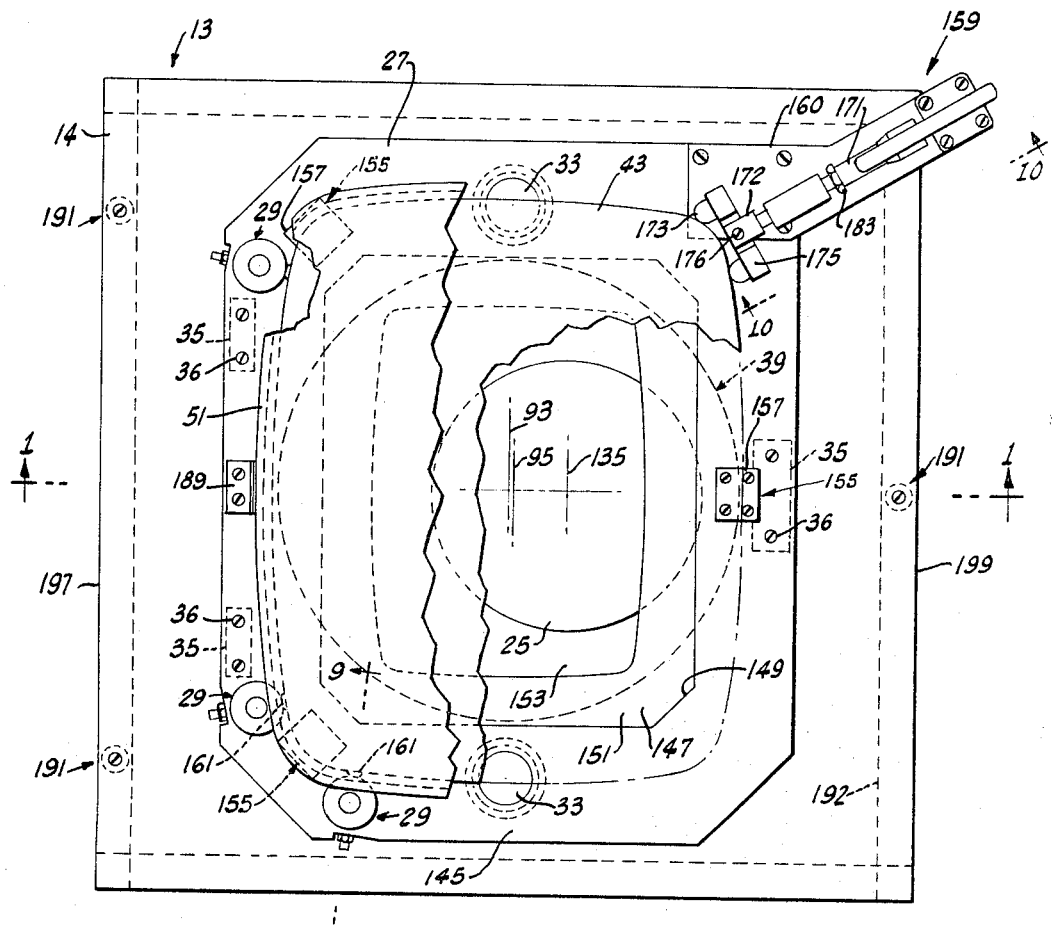
FIGURE 8 is a partially cut-away top plan illustration looking down on the top of the exposure unit.

Panel support means 27, formed substantially as an open centered frame and having a plurality of laterally spaced screen panel locators 29 perimetrically oriented therearound, is spacedly positioned above said base plate portion 13 by height adjustment means 31. Diversified height adjustment is achieved by the use of at least two vertical support shafts 33 and at least two related adjustment blocks 35 as illustrated in FIGURES 1 and 8. Each of the vertical support shafts 33 is affixed to the under portion of the panel support frame 27 and oriented to slidably extend through a bushing 37 in the base plate portion 13 to impart vertical guidance to the panel support frame as height adjustment is varied in accordance with the specific lengths of the adjustment blocks 35 utilized.

A protective shield 39 formed as an opaque skirt-like open-ended enclosure having a nonreflective inner surface 41 is suspended from the panel support frame 27 in a manner to encompass at least the upper portion of the lens support structure 23 to exclude extraneous light from the exposure optical system.

Positioned atop the panel support frame 27 is a cathode ray tube viewing panel 43 having a photoresist and color phosphor disposed on the inner surface 45 thereof to form a light sensitive screen 47. The shape or contour of the panel 43 may be round, oval, rectangular, or any combination or variation thereof. Whatever the contour of the panel, the dimensional geometry and center opening of the panel support frame 27 is made commensurate therewith. For purposes of illustration, a substantially rectangular panel is shown and described herein. Oriented within the panel and spaced from the screen is a negative or foraminous mask 49 through which light is beamed to form a discretely patterned array on the light sensitive screen therebeneath.

Covering the external surface 46 of the viewing panel 43 is a compatibly shaped opaque shielding cap 51, the inner surface 52 thereof being spaced from the external surface of the panel and formed to reduce light reflections during screen exposure.

The combination cathode ray tube screen exposure device 11 hereinbefore described is a versatile unit wherein the adjustable compatible portions interact to provide optical system arrangements required for exposing screens on various shapes and sizes of viewing panels; in addition to effecting adjustments for the compensation of other screening variables associated therewith.

In greater detail there is shown in FIGURES 2 through 6 the various componental parts contained within the point light source enclosure 19. The tip 24 of a diffusely ground quartz light collector rod or radiant energy transmitter 22 protrudes from an aperture 20 in the enclosure and performs as the sole light exit or light source from which directed light is radiated through the lens 25 to the panel. Within the enclosure, the light rod 22 collects light from a small cylindrical mercury vapor lamp 53 positioned proximal to the base 55 of the rod. A reflector unit 57, oriented adjacent to the lamp and shaped to be compatible therewith, is formed with a central head portion 58 having a substantially concave mirror surface 59 thereon. This reflective surface collects and reflects the light rays to the base of the collector rod to thereby direct and utilize a major amount of the light output from the lamp. Surrounding the central head portion 58 is an encompassing collar 60 which is joined thereto as by press fit attachment.

Figure 5:
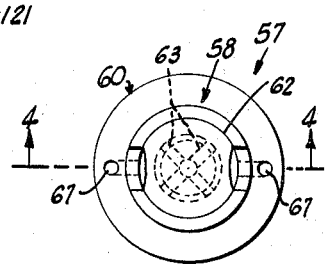
FIGURE 5 is a top plan view of the reflector shown in FIGURE 4.
Figure 4:
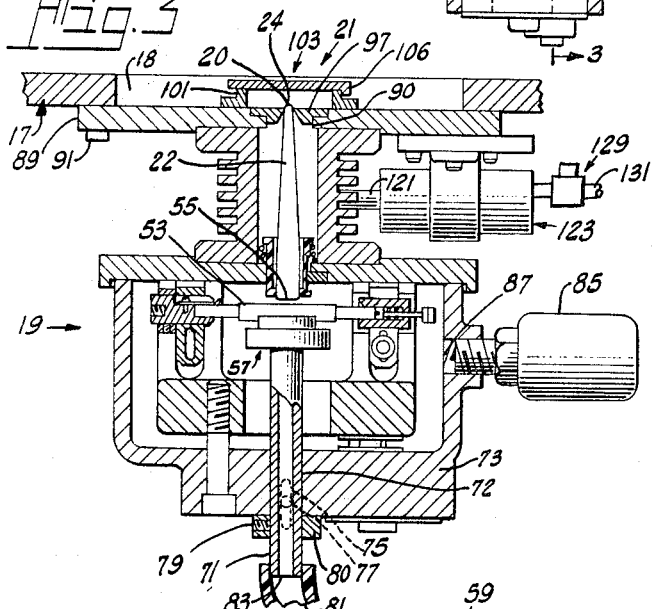
FIGURE 4 is an enlarged sectional view of the point light source internal reflector taken along the line 4—4 of FIGURE 5.
Figure 4:
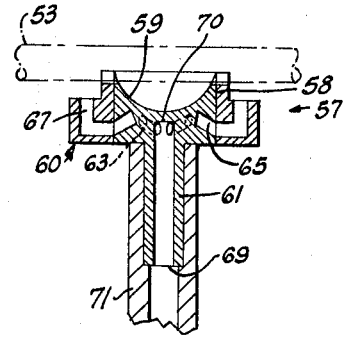
Figure 6:
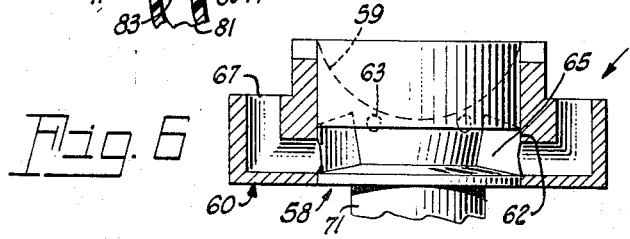
FIGURE 6 is an enlarged elevational view, partly in section, showing constructional aspects of the internal reflector.

The two-piece reflector unit 57 comprising encompassing collar 60 and the head portion 58 is fabricated of metal such as brass. The concave mirror surface 59 disposed on the head portion 58 is formed, for example, by chrome plating and buffing. The head portion 58 has a hollow stem portion 61 extending therefrom with a bottom open end 69 and a top closed end 70 terminating within the head portion near the reflective surface 59. Near the base of the head portion, a circular ring-shaped depression extends inwardly from the periphery thereof to form an annular-shaped manifold 65. Since heat from the lamp is detrimental both to lamp life and undesirable reflector expansion there are within the head portion cooling means in the form of a plurality of spaced air ducts or channels 63 extending radially, from the terminal end 70 of the hollow stem, through the head portion to the annular manifold 65. While it has been found that adequate cooling and air flow is achieved from the four ducts 63 as shown in FIGURE 5, which are located substantially 90 degrees apart, more or fewer ducts can be utilized as desired. These supply or cooling ducts are angularly oriented in vertical planes in a manner to approach spaced tangency with the concave mirror surface 59. The term "spaced tangency" as used herein is intended to describe the orientation of the supply ducts 63 formed in the head portion which pass near but are spaced from the concave reflective surface in a manner approaching geometric tangency. By press fitting the encompassing collar 60 on the head portion 58, part of the inner wall 62 of the collar forms the outer wall of the annular manifold 65. Formed in the encompassing collar are at least two oppositely disposed air channels leading from the manifold 65 as lamp cooling ducts 67 being configurated to direct air flow upon separate areas of the lamp 53. The open end 69 of the stem portion 61 is shaped to seat in a tubular adjustment structure 71 which is formed for substantially vertical sliding movement in a compatibly formed channelized aperture 72 in the base wall 73 of the enclosure 19. A guide slot 75 in the outer wall portion of the adjustment structure 71 cooperates with a threaded stop pin 77 adjustable in the base wall 73 to limit the vertical movement of the reflector adjustment structure 71 and affix the desired positioning thereof. A collar 80 with a set screw 79 therein encompasses the outer portion of the tubular adjustment structure and forms an external stop for vertical movement to prevent internal contact between the reflector and the lamp. By this means, internal adjustment of the reflector unit 57 is easily consummated at any time by manual external manipulation of the adjustment structure, and the associated threaded pin 77, to provide the correct distance relationship between the reflector, the lamp and the light collector rod to achieve optimum light output from the point light source. To facilitate this adjustment procedure and provide adequate means for lamp replacement, a port 74 with a removable closure 76 is located in the wall of the enclosure 19.

An air hose 81, from a supply not shown, is connected to the external open end 83 of the tubular adjustment structure 71. An air pressure, for example, of approximately 40 p.s.i. is thus supplied to the aforedescribed cooling ducts in the reflector unit 57 via the tubular adjustment structure. The unique orientation of the several radial supply channels 63 feeding the annular manifold 65, and the lamp ducts 67 formed in the collar portion of the brass reflector unit effect advantageous cooling of the mirror surface 59 and the adjacent lamp 53 which has heretofore been unachieved. It has been found that adequate cooling can be accomplished with a 65 percent reduction in the volume of air formerly required. Furthermore, the sound level inherent in the cooling operation resultant from pressured air passing through small orifices is likewise reduced.

A still further reduction in the noise level of the cooling operation can be achieved by adding a tuned cavity muffler 85 to the exhaust port 87 of the enclosure 19. A light source mounting plate 89, adapted to accommodate the light source enclosure 19, is attached by cap screws 91 to the under surface of movable circular stage 17 which has an opening 18 therein. As previously stated, this stage is seated on the device base portion 13 and formed to rotate by substantially peripheral engagement therewith on the central axis 93 of the exposure device which intersects the center of the viewing panel 43 positioned thereon. The point light source enclosure is located on the movable stage in a manner to position the tip 24 of the concentrator or light collector rod 22 at a predetermined point, to be referred to as the concentrator axis 95, removed from the central axis 93. This off-set condition is in accordance with the aforedescribed technique of screen dot exposure wherein the disposition of each respective color phosphor array is accomplished by a discretely positioned off-center light source.

As mentioned earlier in this specification, control of radiant energy emanating from the tip of the light collector rod 22 is important for desired screen exposure. To provide adequate shutter means, it is necessary to confine the light source beam of light. An insert cap 97 is compatibly fitted to the opening 90 in the mounting plate 89. This cap has a central aperture 99 therein to accommodate the tip 24 of the light rod 22. On the top surface of the mounting plate 89 is a raised collar 101 affixed to encircle the insert cap 97.

Figure 3:
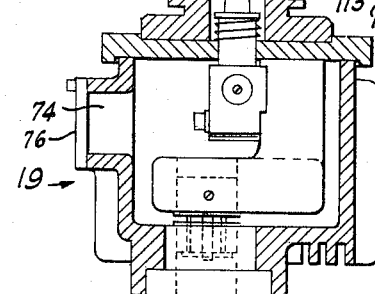
FIGURE 3 is a sectional view of substantially the point light source taken substantially along the line 3—3 of FIGURE 2.
Figure 7:
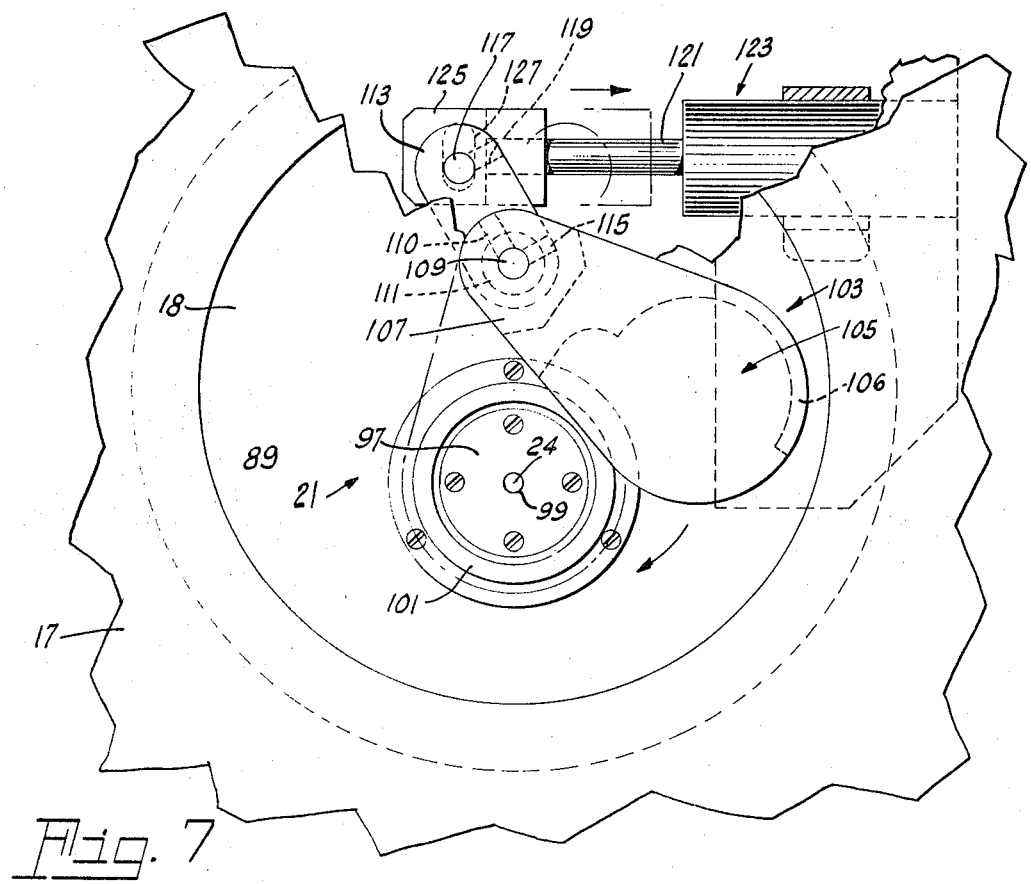
FIGURE 7 is a partially cut-away top plan view of the light source shutter arrangement.

With reference particularly to FIGURES 2, 3, and 7, a shutter blade 103 has a closure portion 105 and a shank portion 107 suitably tapped to accommodate a blade pin 109 which is affixed therein by a set screw 110. This blade pin extends through and beyond a bushing insert 111 in mounting plate 89 and provides a pivot point for arcuate movement of the blade. This enables the closure portion 105 to slidably cover the raised collar 101 to effect a closed position thereon and block the beam of light radiating from the tip of the light collector rod 22. The closure portion 105 is formed to overhang the raised collar 101 and, in addition, has a protruding ridge 106 formed to partially encompass the collar and provide increased light control. To further inhibit light leakage and reflection, the inner surface of the closure portion 105 is of a black matte finish.

A shutter blade arm or connecting link 113 is drilled at one end to accept that portion of the blade pin 109 protruding below bushing 111. A set screw 115 secures the link to the pin 109 and provides a fixed blade-link relationship. The opposite end of the link is tapped to receive stub pin 117 which is affixed therein by a set screw 119. The piston shaft 121 of air cylinder 123 has a linkage block 125 attached to the terminal end thereof. This block has a slot 127 formed therein to accept stub pin 117 and permit linkage movement. In FIGURE 7, the solid line illustration shows the shutter blade 103 in the open position. Closing of the shutter is accomplished by retraction of the piston 121 which moves the linkage block 125 toward the cylinder 123 thereby imparting movement to the integrated blade 103-link 113 combination by rotating blade pin 109 in bushing 111. This action is shown in phantom in FIGURE 7.

Accurate predetermined control of the shutter movement is provided by a timer 129 associated with the air cylinder 123. This timer may be of a mechanical, electrical, or pneumatic nature which accurately controls the air supply means 131. The shutter can also be actuated by mechanical or electrical means in lieu of air cylinder 123.

A lens support structure 23 is suitably oriented and attached to the upper surface of the movable stage 17 by at least two cap bolts 130 which are compatible with at least two slots 132 in the stage to facilitate lateral movement of the lens support structure thereon. The height of this support structure is in keeping with the optical system requirements and the inner surface 133 is formed and finished to inhibit light reflections. The top portion of the structure 23 is adapted to hold a lens 25 having an axis 135. Because of exposure system requirements, the lens axis 135 is removed from the axes 93 and 95 of the device 11 and concentrator 22, respectively.

The circular movable stage 17, with its integral components, i.e., the light source enclosure 19, shutter means 21, and the lens supporting structure 23 with the lens 25 therein, is substantially peripherally supported on a compatibly dimensioned seating ledge 137 surrounding the circular opening 15 in the base plate 13. Since the stage is oriented to rotate on the central axis 93 of the device, the related light source and lens components of the optical system can be accurately positioned in desired off-center relationship, with respect to the central axis, to effect angular light activation for the discrete exposure of each color field array through the common negative mask 49. Placement pins or studs 139 align specific stage placement holes 141 with specific base placement holes 143 to facilitate definite index placement of the stage for each color phosphor exposure. The placement pins 139 and compatible holes 141 can be tapered to effect positive placement.

Height adjustment means 31 for panel support means 27 effects adjustable height above the base plate portion 13 by utilizing at least two related adjustment blocks 35 which function as spacers to provide the proper optical distance relationship for the respective panel exposure. These adjustment blocks are of removable types and may be replaced to effect different heights. They are usually temporarily fixed by retaining screws 36 which impart rigidity to the exposure device structure. The necessary alignment relationship of the panel support 27, with the other parts of the exposure device 11, is maintained by the use of at least two vertical support shafts 33 which are affixed to and extended downward from the panel support. These shafts are symmetrically oriented to slidably extend through suitable bushings 37 in the base 13 and thus provide guided alignment and stability to the panel supporting structure.

Affixed to and suspended from the panel support 27 is a protective shield 39 in the form of an opaque skirt-like open-ended enclosure. This shield extends downward toward the base plate 13 in a manner to encompass at least the upper portion of the lens support structure to exclude extraneous light from the optical system and afford protection to the lens. The inner surface of this shield is of a nonreflective finish.

The panel support structure 27 is formed substantially as a frame 145 having a center opening 147. The general shape or periphery 149 of the center opening is usually in accordance with the shape of the panel being exposed. With reference to FIGURE 8, the panel 43 is substantially rectangular in shape and the center opening periphery 149 is an approximation thereof. A light template 151 of a nonreflective finish is associated with the panel support frame. This template has an opening conforming to but smaller than the shape of the screen and serves as a light mask confining the exposure light to a properly dimensioned beam to fit the respective screen.

On the top of the panel support frame 27 are a plurality of panel rests 155 which are positionally spaced to afford adequate support means for the cathode ray tube viewing panel 43. At least the top portions 157 of these rests are covered with a plastic material such as tetrafluoroethylene resin to provide a firm but cushioned contact with the panel placed thereupon.

Figure 9:
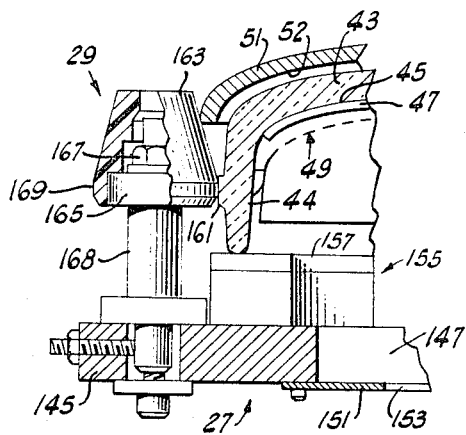
FIGURE 9 is an enlarged sectional view showing panel locator means taken along the line 9—9 of FIGURE 8.

Several panel locators 29 are oriented at substantially corner positions to make contact with the skirt portion 44 of the panel 43 to provide proper alignment thereof. For rectangular panels, the use of three locators 29 and a pressured locking device 159 has been found to be adequate for undistorted alignment positioning of the screen panel. Two of the locators are substantially positioned on a long side of the rectangular panel; one near either corner thereof with the third locator contacting a short side of the panel proximal to one of the supported corners to provide a dually supported corner. The locking device 159 provides controlled pressure to two spaced areas on the panel corner diagonally opposite the above-mentioned dually supported corner. As shown in FIGURES 8 and 9, each locator 29 is oriented to make contact with a raised area of glass protruding slightly from the exterior surface of the panel skirt 44 and conventionally designated in the art as a reference pad 161. For panels not containing these pads, locator contact is made with the skirt in substantially the same regions. With reference to FIGURE 9, the locator head 163 is substantially shaped as a truncated cone having a hollow interior dimensioned to accommodate a press-fit high precision bearing 165 and a confining shaft nut 167. The bearing permits the head to easily revolve on a support shaft 168 affixed to frame 145. This ease of rotation facilitates even wearing of the outer contact surface 169. It is desirable to have the locator head made of a material, such as a Bakelite-type plastic, having a slight degree of resiliency and yet not be of a permanently deformable nature.

Figure 10:
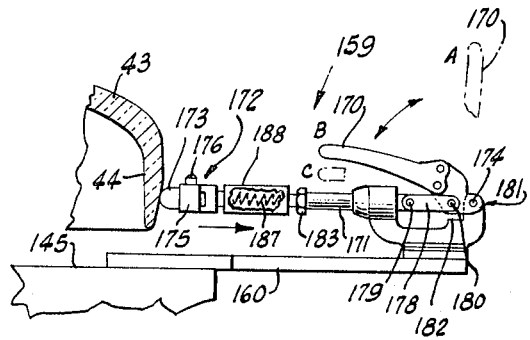
FIGURE 10 is an illustration of compression means utilized for panel positioning taken along the line 10—10 of FIGURE 8.

With reference to FIGURE 10, the pressured locking device 159, affixed to a mounting support 160 extended from frame 145, is a linkage arrangement operated by lever 170. Pivot means 174 permits arcuate travel of lever 170 and facilitates movement thereof through positions A, B, and C thereby providing predetermined forward and retracting horizontal motion to slidable shaft 171 having a terminal yoke-type head 172 affixed thereto. Two contact knobs 173, of a slightly resilient material such as tetrafluoroethylene resin, are spacedly located on a horizontal swivel bar 175 which is pivoted in the yoke head 172 by pin 176. This pivoted accommodation for the contact knobs 173 provides even pressure to two areas on the corner of panel 43. It is important that the dimensions of the panel remain unchanged by the pressure applied since a temporarily misshapen panel resultant from excessive pressure applied during screen exposure causes subsequent misalignment of the mask and screen when the panel is removed. This greatly reduces the quality of the screen and the efficiency of the exposure system. To prevent compressed panel distortion, the pressured locking device 159 has a mechanical feature whereby sufficient pressure is exerted against the panel to insure definite lateral placement, whereupon the pressure is relaxed slightly to prevent panel distortion and yet be of a sufficiency to maintain positive panel placement. This alleviation of pressure is accomplished through mechanical linkage in the form of a connecting rod 178 having, at one end thereof, a first pivot 179 movably attached to the base of shaft 171 and a second pivot 180, at the opposite end, attached in a movable manner to the base portion of lever 170. As shown in FIGURE 10, with lever 170 at position B, which is intermediate positions A and C, the connecting rod 178 is oriented to exert maximum pressure to the slidable shaft 171 to provide definite lateral placement of the panel. This maximum pressure arrangement is evidenced by the first pivot 179, the second pivot 180, and the lever pivot 174 being in a common imagery conjunctive plane 181. Overtravel movement of the second pivot 180 to a position either above or below this plane results in a retracting movement of shaft 171. Continuing the motion of lever 170 to position C lowers the second pivot 180 to a location below the plane and causes the second pivot end of the connecting rod 178 to stop or lock upon a seat 182. As previously mentioned, this slightly retracts the shaft 171 and reduces the holding pressure exerted on the panel skirt 44 to a positional but undistortional value. Upon completion of the exposure operation, the lever is moved from position C back through position B to position A. This shifts the second pivot 180 to a location above the conjunctive plane 181 and shaft 171 is again retracted. Thus, contact between the knobs and the panel skirt is released and the terminal head of the locking device is withdrawn sufficiently to permit removal of the panel from the exposure device.

Pressure adjustment means 183 on shaft 171 cooperates with an internally loaded compression spring arrangement 187, encompassing the shaft and contained within housing 188, to facilitate fine adjustment control of the amount of pressure applied to the panel.

An opaque shielding cap 51 is formed to cover the external surface 46 of the viewing panel 43 to confine exposure light to the panel and prevent the entrance of ambient light during exposure. In addition, the cap protects the eyes of the operator from ultraviolet light during exposure, and affords protection for the lens when the exposure device is not in use. The panel cap is positioned so that the surface 52 thereof is spaced from the external panel surface 46 to prevent abrasion of the panel. The cap's inner surface 52 is desirably of a non-reflective roughened black finish to reduce reflections back through the panel to the sensitive coating during exposure. The cap 51 is formed of an opaque high impact plastic material with at least one hinge 189 suitably affixed to the panel support frame 145. The cap firmly seats upon placement means such as panel rests 155 to assure desired spaced orientation with the viewing panel.

The aforedescribed screen exposure device, constructed upon the base plate 13, is mounted as a unit on a suitable table frame structure 14 by a triangulation technique in the form of a three-point stabilizing suspension means 191 as shown in FIGURES 1 and 8. The table frame 14 having a plurality of supporting legs 190 is ruggedly fabricated, for example, of welded angle iron to have an open top frame 192 to thereby spacedly accommodate the light source enclosure 19 and the vertical support shafts 33 extending beneath the base plate 13. The discrete three-point suspension areas 191 are formed by three support pins 193, spaced in substantially triangular placement on base plate 13, wherein two are located in compatible holes 195 near the extremities of the back edge portion 197 of the base and one near the center of the opposite or front edge portion 199 of the base. Suitable holes 201 in the top frame 192 accommodate the protrusions of bolts 193 therethrough. Spacer washers 203 separate the base 13 from the frame 14 at three points as described. In this manner, the base supported exposure device 11 is protected from slight flexure of the table frame 14 caused by uneven surface of the floor 205. This is a very important consideration since any strain or torsional stress of the base 13 will impair the accuracy of the optical system. Further leg adjustment is afforded by height regulating means 207 which is, for example, in the form of a variable screw-type stud arrangement 209 making seated contact with a floor block 211.

Thus, there is provided an improved combination device for exposing sensitized screens on cathode ray tube viewing panels. The device has adjustable features to facilitate the change in optical system dimensions as required for various sizes and shapes of screens and coating compositions utilized thereon. In addition, means for stabilizing the support of the exposure structure insures optimum performance of the optical system therein. Increased efficiency of light output and accurate automatic control thereof, improved cooling of optical component, enhanced quietness of operation, and overall improved radiant energy shielding has been accomplished by this combination device in a manner heretofore unachieved.

While there has been shown and described what is at present considered the preferred embodiment of the invent, it will be obvious to those skilled in the art that various changes and modifications may be made therein without departing from the invention as defined by the appended claims.

What is claimed is:

1. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source in the form of a light collector rod and a lamp encased within an enclosure with the tip of said rod protruding from an aperture therein, said enclosure having an exhaust port therein;

a reflector unit positioned adjacent said lamp and formed with an encompassing collar and a head portion having a substantially concave mirror surface thereon, said reflector unit being adapted for vertical adjustment means to provide maximum light output in accordance with said optical system requirements, said reflector adjustment means being constructed in the form of a substantially tubular structure to effect the introduction of pressured air into the interior of said enclosure and to extend externally from said enclosure to facilitate reflector adjustment, said head portion having a hollow stem portion formed with an open end and shaped to seat in said tubular adjustment means, said head portion having cooling means in the form of a plurality of spaced air ducts radially extending within said head portion from the hollow stem thereof to an annular manifold formed therein adjacent said encompassing collar, said encompassing collar having at least two cooling channels therein leading from said manifold and configurated to direct air upon said lamp;

a stage adapted to integrally accommodate said point light source with provisions to spacedly orient a lens thereabove to provide radiant energy refraction in accordance with said optical system requirements; said screen portion of said panel, said lens, and said light source forming said optical system;

a base portion formed to accommodate said stage; and panel support means spacedly positioned above said base portion.

2. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source in the form of a light collector rod and a lamp encased within an enclosure with the tip of said rod protruding from an aperture therein, said enclosure having an exhaust port therein;

a reflector unit positioned adjacent said lamp and formed with an encompassing collar and a head portion having a substantially concave mirror surface thereon, said reflector unit being adapted for vertical adjustment means to provide maximum light output in accordance with said optical system requirements, said reflector adjustment means being constructed in the form of a substantially tubular structure to effect the introduction of pressured air into the interior of said enclosure and to extend externally from said enclosure to facilitate reflector adjustment, said head portion having a hollow stem portion formed with an open end and shaped to seat in said tubular adjustment means, said hollow stem portioin terminating in said head portion, said head portion having cooling means in the form of a plurality of spaced air ducts radially extending within said head portion from the hollow stem thereof to an annular manifold formed therein adjacent said encompassing collar, said ducts being substantially radially spaced and angularly oriented in vertical planes to approach spaced tangency with said concave mirror surface, said encompassing collar having at least two cooling channels therein leading from said manifold and formed as substantially oppositely disposed lamp cooling ducts configurated to direct air upon said lamp;

shutter means adapted to cover said tip of said collector rod to provide control of said radiant energy emanating therefrom;

a stage adapted to integrally accommodate said point light source and said shutter means with integral positioning provisions to spacedly orient a lens thereabove to provide radiant energy refraction in accordance with said optical system requirements; said screen portion of said panel, said lens, said shutter means, and said light source forming said optical system;

a base portion formed to accommodate said stage; and panel support means spacedly positioned above said base portion.

3. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source employing at least a light collector rod and a lamp encased within an enclosure with the tip of said rod protruding from an aperture therein, said enclosure having an exhaust port in the wall thereof;

a tuned cavity muffler attached to said exhaust port of said enclosure to reduce the sound frequency level of the expelled air;

shutter means adapted to laterally cover said tip of said collector rod and formed to effect open and closed positions;

actuating means linked to said shutter to effect open and closed movement of the same and to provide automatic timed control of said radiant energy emanating from said collector rod;

a stage adapted to integrally accommodate said point light source and said shuter means with integral positioning provisions to spacedly orient a lens thereabove to provide radiant energy refraction in accordance with said optical system requirements; said screen portion of said panel, said lens, said shutter means and said light source forming said optical system;

a base portion formed to accommodate said stage; and panel support means spacedly positioned above said base portion.

4. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source employing at least a light collector rod and a lamp encased within an enclosure with the tip of said rod protruding from an aperture therein;

a pivoted shutter blade having a closure portion formed to laterally cover and overhang a raised collar encompassing said tip of said collector rod to provide open and closed positions to thereby control said radiant energy emanating from said rod, said closure portion having a black matte inner surface;

timer controlled actuating means linked to said shutter to effect open and closed predetermined movement of the same;

a stage adapted to integrally accommodate said point light source and said shutter means with integral provisions to spacedly orient a lens thereabove to provide radiant energy refraction in accordance with said optical system requirements; said screen portion of said panel, said lens, said shutter means, and said light source forming said optical system;

a base portion formed to accommodate said stage; and panel support means spacedly positioned above said base portion.

5. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy commensurate with said optical system requirements;

a stage formed to accommodate said point light source and a related lens spaced thereabove on a lens support structure, said stage being adapted for placement in a plurality of discrete positions relative to said central axis in accordance with said optical system requirements; said screen portion of said panel, said lens, and said light source forming said optical system;

a base portion formed to accommodate said stage;

panel support means formed substantially as an open centered frame spacedly positioned above said base portion, said support means having a plurality of laterally spaced locators and a pressured locking device thereon to provide undistorted alignment positioning of said screen panel; and a protective shield formed as a substantially opaque skirt-like enclosure having a nonreflective inner surface suspended from said panel support means encompassing at least the upper portion of said lens support structure to exclude extraneous light from said optical system.

6. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed in a manner commensurate with said optical system requirements to provide an exposure beam of radiant energy;

a stage formed to accommodate said point light source and a related lens spaced thereabove on a laterally adjustable lens support structure, said stage being adapted for placement in a plurality of discrete positions relative to said central axis in accordance with said optical system requirements; said screen portion of said panel, said lens, and said light source forming said optical system;

a base portion formed to accommodate said stage;

panel support means formed substantially as an open centered frame spacedly positioned on said central axis above said base portion, said frame having panel rest means and a plurality of laterally spaced panel locators with a pressured locking device thereon to provide pressure in a common panel plane to discrete areas of the panel to consummate undistored alignment positioning of said screen panel on said rest means;

a light template associated with said support frame to provide proper dimensioning to said exposure beam;

a protective shield formed as a substantially opaque skirt-like open-ended enclosure having a nonreflective inner surface suspended from said panel support means encompassing at least the upper portion of said lens support structure to exclude extraneous light from said optical system and afford protection to said lens; and height adjustment means intermediate said base portion and said panel support means formed to provide distance adjustments therebetween, said adjustment means being symmetrically formed to provide at least two vertical support shafts and at least two related adjustment blocks, one end of each of said vertical support shafts being affixed to and extended downward from said panel support frame and oriented to slidably extend through bushings in said base portion to provide guided positioning for said frame, said adjustment blocks being formed to provide positive spacing between said base portion and said panel support frame in accordance with said optical system requirements.

7. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to provide an exposure beam of radiant energy commensurate with said optical system requirements;

a stage formed to accommodate said point light source and a related lens spaced thereabove on a lens support structure, said stage being adapted for placement in a plurality of discrete positions relative said central axis;

a base portion formed to accommodate said stage; and panel support means formed substantially as an open centered frame spacedly positioned on said central axis above said base portion, said frame having panel rest means and a plurality of laterally spaced panel locators with a pressured locking device thereon to provide pressure in a common panel plane to discrete areas of the panel to consummate undistorted alignment positioning of said screen panel on said rest means, said locking device having a lever with a pivot in the base portion thereof and mechanical linkage in the form of a connecting rod with a first pivot movably connected to a slidable pressure shaft and a second pivot at the opposite end thereof movably attached to said lever base portion, said locking device formed to provide maximum pressure to said panel when said first pivot, said second pivot, and said lever pivot are in an imaginary conjunctive plane, said mechanical linkage adapted to permit over-travel movement of said second pivot above and below said conjunctive plane to provide controlled release of said pressure on said panel.

8. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy commensurate with said optical system requirements;

a stage formed to accommodate said point light source and a related lens spaced thereabove on a lens support structure, said stage being adapted for placement in a plurality of discrete positions relative to said central axis;

a base portion formed to accommodate said stage;

panel support means formed substantially as an open centered frame spacedly positioned above said base portion, said support means having a plurality of laterally spaced locators and a pressured locking device thereon to provide undistorted alignment positioning of said screen panel; and an opaque shielding cap formed to cover the external surface of said panel, the inner surface of said cap being spaced from said external surface of said panel and having an inner surface formed to reduce radiant energy reflections during screen exposure.

9. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy commensurate with said optical system requirements;

a movable stage formed to accommodate said point light source positioned therebeneath, and a related lens spaced thereabove on a lens support structure;

a base portion formed to accommodate said stage;

a frame portion formed to provide spaced support to said base portion, said frame portion having three discrete support areas substantially in the form of a triangulation providing a three point stabilizing suspension means for said base portion, said suspension means being formed by three support pins extending from said base portion through three spacer means into three compatible receiving means in the top of said frame portion, said base portion being vertically spaced from said frame portion by said spacers at said support areas to provide unobstructed three point support to said base portion in a manner substantially free from torsional stress; and panel support means formed substantially as an open centered frame spacedly positioned above said base portion.

10. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source in the form of a light collector rod and a lamp encased within an enclosure with the tip of said rod protruding from an aperture therein, said enclosure having an exhaust port in the wall thereof;

a reflector unit positioned within said enclosure adjacent said lamp and formed to have vertical adjustment to provide maximum light output in accordance with said optical system requirements, said adjustment means extending externally from said enclosure to facilitate said reflector adjustment, said reflector structure having cooling means in the form of a plurality of spaced channels radially extending within said structure from the hollow stem thereof to the periphery of said reflective surface, at least two of said channels being configurated to direct air upon said lamp;

a tuned cavity muffler attached to said exhaust port of said enclosure to reduce the sound frequency level of the expelled air;

shutter means adapted to cover said tip of said collector rod and formed to effect open and closed positions;

actuating means linked to said shutter to effect open and closed movement of the same and to provide automatic timed control of said radiant energy emanating therefrom;

a movable stage formed to accommodate said point light source, said shutter means with said actuating means, and a related lens spaced thereabove on a laterally adjustable lens support structure having a nonreflective inner surface, said stage being adapted to rotationally index into discrete positions relative to said central axis in accordance with said optical system requirements; said screen portion of said panel, said lens, said shutter means, and said light source forming said optical system;

a base portion formed to accommodate said stage;

a frame portion formed to support said base portion in a substantially triangulated manner free from torsional stress;

panel support means formed substantially as an open centered frame spacedly positioned above said base portion, said support means having a plurality of laterally spaced locators and a pressured mechanical locking device thereon to provide undistorted alignment positioning of said screen panel;

a light template associated with said support frame to provide proper dimensioning to said exposure beam;

a light shield formed as a substantially opaque skirt-like enclosure having a nonreflective inner surface suspended from said panel support means encompassing at least the upper portion of said lens support structure to exclude extraneous light from said optical system;

height adjustment means intermediate said base portion and said panel support means formed to provide distance adjustments therebetween in accordance with said optical system requirements; and panel shielding means formed to externally cap said panel during screen exposure thereof to facilitate optimum exposure control.

11. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy for said screen exposure;

a light permeable refractive medium oriented between said light source and said panel to provide radiant energy refraction in accordance with said optical system requirements; said screen portion of said panel, said refractive medium, and said light source forming said optical system;

a movable stage positioned intermediate said light source and said panel and formed to integrally accommodate said point light source therebelow and said refractive medium thereabove, and panel support means spacedly and independently positioned above said stage.

12. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy for said screen exposure;

light control means having a movable closure portion adapted to provide control of said radiant energy emanating from said point light source;

a light permeable refractive medium oriented between said light source and said panel to provide radiant energy refraction in accordance with said optical system requirements, said screen portion of said panel, said refractive medium, said light control means, and said light source forming said optical system;

a movable stage positioned intermediate said light source and said panel and formed to integrally accommodate said point light source therebelow and said refractive medium thereabove; and panel support means spacedly and independently positioned above said stage.

13. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy for said screen exposure;

a light permeable refractive medium oriented between said light source and said panel to provide radiant energy refraction in accordance with said optical system requirements; said screen portion of said panel, said refractive medium, and said light source forming said optical system;

a movable stage positioned intermediate said light source and said panel and formed to integrally accommodate said point light source therebelow and said refractive medium thereabove;

a base portion formed to accommodate said stage;

panel support means spacedly and independently positioned above said stage; and height adjustment means for said panel support means in the form of at least two movable vertical shafts affixed to said panel support means and oriented to slidably extend through bushing means in said base portion to provide distance adjustments for said optical system.

14. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy for said screen exposure;

reflective means associated with said light source formed to provide external adjustment in accordance with said optical system requirements;

a light permeable refractive medium oriented between said light source and said panel to provide radiant energy refraction in accordance with said optical system requirements; said screen portion of said panel, said refractive medium, and said light source forming said optical system;

a movable stage positioned intermediate said light source and said panel and formed to integrally accommodate said point light source therebelow and said refractive medium thereabove; and panel support means spacedly and independently positioned above said stage.

15. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy for said screen exposure;

a light permeable refractive medium oriented between said light source and said panel to provide radiant energy refraction in accordance with said optical system requirements; said screen portion of said panel, said refractive medium, and said light source forming said optical system;

a movable stage positioned intermediate said light source and said panel and formed to integrally accommodate said point light source therebelow and said refractive medium thereabove;

a base portion formed to accommodate said stage;

panel support means spacedly positioned above said base portion; and panel shielding means formed substantially as a cap to externally cover said panel during screen exposure thereof, said shielding means being discretely spaced from said panel to prevent exterior abrasion thereof and facilitate optimum exposure control.

16. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy for said screen exposure;

a lens oriented between said light source and said panel to provide radiant energy refraction in accordance with said optical system requirements; said screen portion of said panel, said lens and said light source forming said optical system;

a movable stage positioned intermediate said light source and said panel and formed to integrally accommodate said point light source therebelow and said refractive medium thereabove;

a base portion formed to accommodate said stage;

a frame portion formed to support several discrete areas of said base portion in a manner that said base portion is substantially free from torsional stress to provide optimum performance of the optical system; and panel support means spacedly positioned above said base portion.

17. An exposure device having therein a central axis and a related adjustable optical system formed to provide radiant energy exposure of various sizes and shapes of transversely disposed cathode ray tube sensitized screen panels each having a grid negative spatially positioned relative to the screen portion thereof, said device comprising in combination:

a point light source formed to emanate directed radiant energy for said screen exposure;

shutter means associated with said light source to provide predetermined control of said radiant energy emanating therefrom;

a lens structure oriented between said light source and said panel to provide radiant energy refraction in accordance with optical system requirements, said screen portions of said panel, said lens, said shutter means and said light source forming said optical system;

a movable stage positioned intermediate said light source and said panel and formed to integrally accommodate said point light source therebelow, said lens thereabove and said shutter means therebetween, said lens being supported on a laterally adjustable lens support structure having a non-reflective inner surface, said stage being adapted to rotationally index into discrete positions relative to said central axis to provide definite positioning of said lens and said light source and effect angular light activation of said screen through said related negative in accordance with said optical system employed; said screen portion of said panel, said lens, said shutter means, and said light source forming said optical system;

a base portion formed to accommodate said stage; and panel support means spacedly positioned above said base portion.

18. An exposure device having therein a central axis and a related adjustable optical system formed to provide radiant energy exposure of various sizes and shapes of transversely disposed cathode ray tube sensitized screen panels each having a sidewall portion wherein a grid negative is oriented and spatially positioned relative to the screen portion thereof, said device comprising in combination:

a point light source formed to emanate directed radiant energy for said screen exposure;

a light permeable refractive medium oriented between said light source and said panel to provide radiant energy refraction in accordance with said optical system requirements; said screen portion of said panel, said refractive medium, and said light source forming said optical system;

a movable stage positioned intermediate said light source and said panel and formed to integrally accommodate said point light source therebelow and said refractive medium thereabove;

a base portion formed to accommodate said stage; and panel support means formed substantially as an open centered frame spacedly positioned in an adjustable manner above said base portion, said panel support means having a plurality of laterally spaced locators and a pressured locking device thereon, said locators and said locking device being formed to make lateral contact with said panel sidewall portion to provide undistorted alignment positioning of said screen panel.

References Cited

UNITED STATES PATENTS 2,941,457   6/1960   Weingarten _____ 95—1
2,942,099   6/1960   Goldstein _____ 95—1 X JOHN M. HORAN, *Primary Examiner.*